July 4, 1939. A. B. DE SALARDI 2,164,870
TORQUE LIMITING DEVICE
Filed Oct. 8, 1936 2 Sheets-Sheet 1
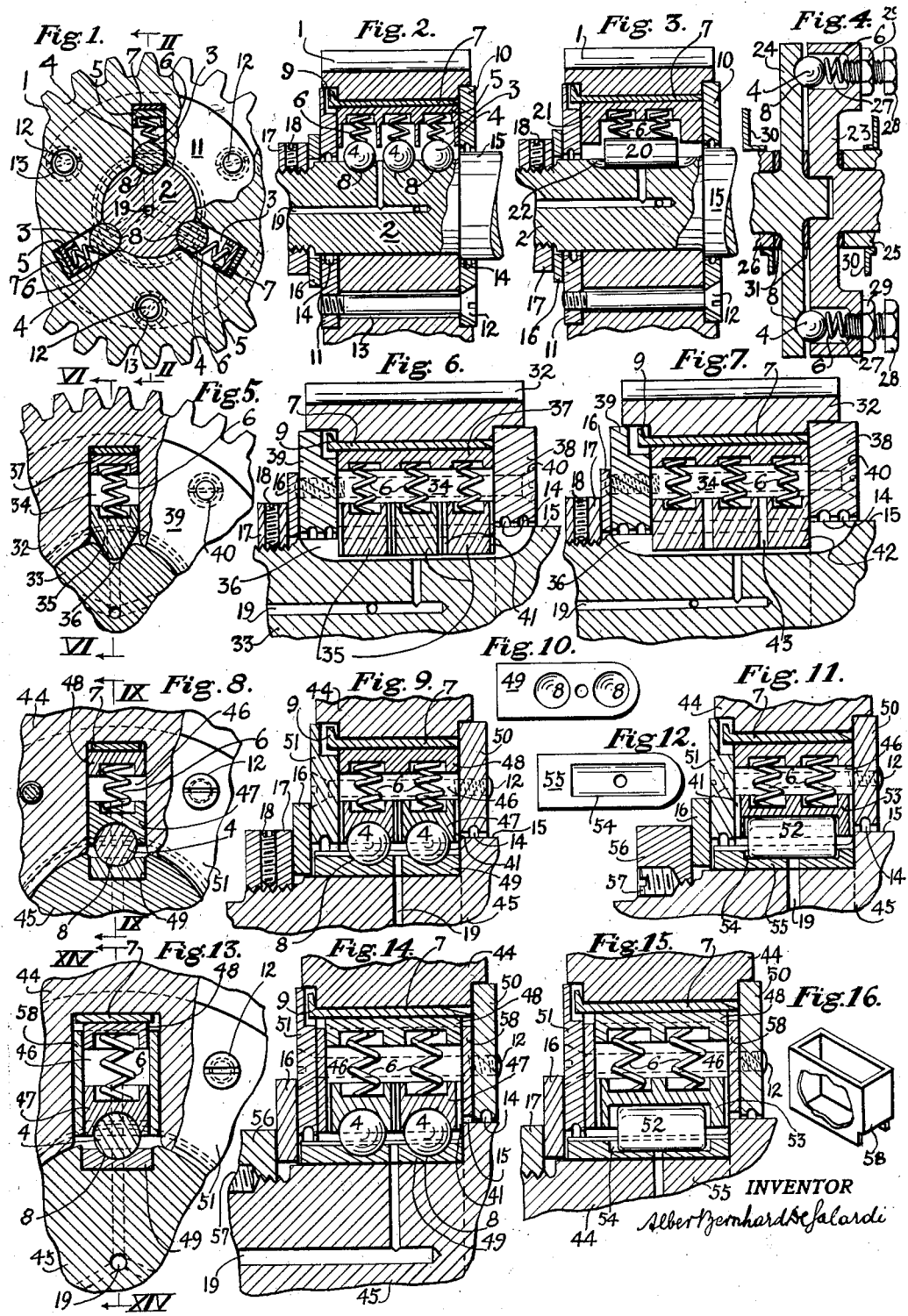
INVENTOR
Albert Bernhard de Salardi

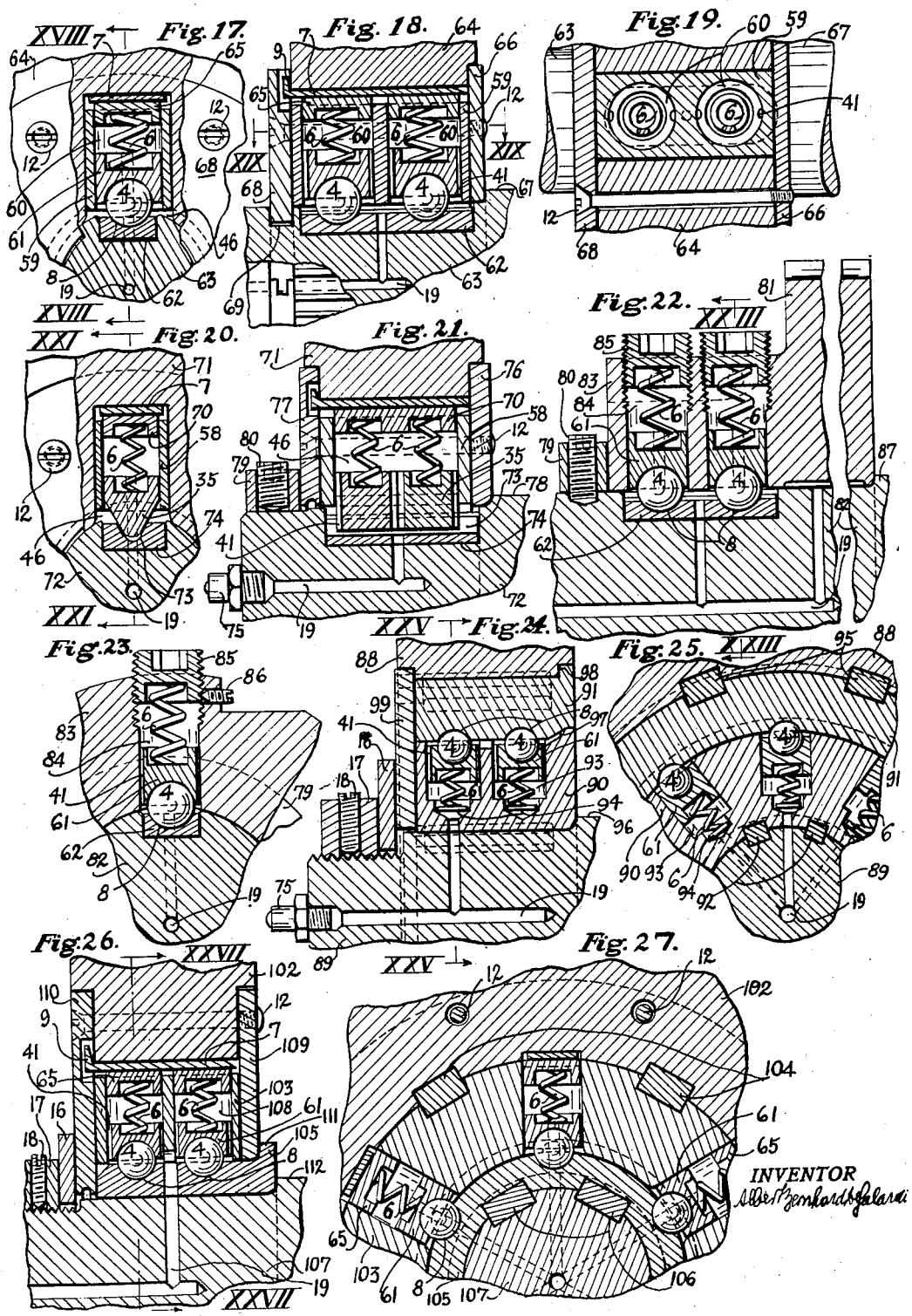

Patented July 4, 1939

2,164,870

UNITED STATES PATENT OFFICE 2,164,870

TORQUE LIMITING DEVICE

Albert Bernhard De Salardi, Wilkinsburg, Pa., assignor, by mesne assignments, of one-half to Walter E. Volkwein, Pittsburgh, Pa.

Application October 8, 1936, Serial No. 104,656

4 Claims. (Cl. 64—29)

My invention relates to devices connecting a driving and a driven member of a mechanical power transmission having the purpose to transmit torque limiting it to an allowed maximum.

Heretofore parts of a mechanical power transmitting system had to be largely over-dimensioned to take care of the dynamic stresses due to shocks and excess loads which occur as unavoidable incidents to almost all mechanical operation, and even these over-dimensioned parts were often broken, or excessively worn due to such shocks and excess loads, necessitating the suspension of operation and costly repairs.

To avoid such costly repairs, easier exchangeable low-cost frangible members like bolts and pins weakened by grooves, etc., were introduced to protect the more expensive parts. These reduced the cost of the repair in each instance somewhat, but making the breakage more frequent, instead of eliminating it, the method provided little relief.

Another attempt of limiting the torque by slip couplings known today is practicable only in special cases, where such expensive, heavy, cumbersome and voluminous addition like a known slip coupling is allowable. Besides slip couplings of conventional design wear out relatively quickly, their parts being subjected to heavy sliding friction.

The present invention does away with the above draw-backs as it limits the transmitted torque to a pre-determined maximum between the driving and the driven members obviating their breakage. One object of my invention is thus to limit the torque transmitted between the rotating members of a mechanical power transmission to a pre-determined allowable maximum by automatically disengaging the members, when the torque becomes greater than the allowed safe maximum, and re-engaging them, when the torque becomes equal to or less than such safe maximum. Another object is to eliminate the danger of breakage or excessive wear of the power transmitting parts. Still another object is to make possible the employment of comparatively lighter parts in a mechanical power transmission and of the driven machinery by maintaining safety against breaking. And another object is to reduce the space needed for such mechanical power transmission.

These and other objects will be clearly evident from the following description and attached drawings in which:

Fig. 1 shows a fragment of a spur gear and a shaft as exemplary two members of a mechanical power transmission between which torque is to be transmitted. The spur gear is shown partly in elevational view but substantially in a radial section, rotatably mounted on a shaft, shown in radial section. These two, driven and driving members, are connected by locking elements comprising antifrictional pressure bearing parts, such as balls.

Fig. 2 is a fragmentary axial section on the line II—II of Fig. 1.

Fig. 3 is a partial axial section of the same first group of the invented device as illustrated by Fig. 1 with the difference that the employed antifrictional locking members are rollers.

Fig. 4 is a diagrammatical axial sectional view of another embodiment belonging to the first group in which antifrictional locking members are used between driving and driven parts which are discs mounted adjacent to each other on the co-axial shafts.

Fig. 5 is a fragmental view chiefly in radial section of a spur gear mounted on a shaft and connected to it with an embodiment of the second group of the invented device comprising wedge-like locking elements.

Fig. 66 is a fragmental axial sectional view taken on line VI—VI of Fig. 5.

Fig. 7 is a fragmental axial sectional view of substantially the same embodiment as shown in Figs. 5 and 6 except that instead of the individual adjacent wedge-like locking members these are united into locking bars.

Fig. 8 is a fragmental view substantially in radial section of an embodiment belonging to the first group of the invented device employing antifrictional pressure bearing locking elements between the driving and driven parts, latter being provided with guiding means for leading such locking elements.

Fig. 9 is a fragmental axial section on the line IX—IX of Fig. 8.

Fig. 10 is a plan view of a key-like insert in the shaft, the former provided with seats for the balls and with a bore to admit lubricant.

Fig. 11 is a fragmental axial section of substantially the same embodiment as shown in Figs. 8 and 9, except that instead of balls one or more rollers are employed as locking elements between the driving and driven members.

Fig. 12 is the plan view of a key-like insert in the shaft provided with a suitable seat for a roller and with a bore to admit a lubricant.

Fig. 13 is a fragmental view chiefly in radial section of an embodiment belonging to the third group of the invented device in which the locking elements and co-operating parts between driving and driven members are enclosed in one or more casings attached to the driving and driven members respectively.

Fig. 14 is a fragmental axial section on the line XIV—XIV of Fig. 13.

Fig. 15 is a fragmental axial section of substantially the same embodiment which is shown in Figs. 13 and 14, except that instead of balls one or more rollers are used as antifrictional pressure bearing locking elements.

Fig. 16 is a perspective view of an exemplary embodiment of the casing holding the locking elements and the cooperating parts.

Fig. 17 shows a fractional view substantially in radial section of an embodiment belonging to the third group as illustrated by the Figs. 13, 14, and 15 with the difference that the casings harboring the locking elements are solid prismatic blocks that are provided with cylindrical bores in which the cylindrical guides of the locking elements are reciprocably mounted, subjected to the pressure of the cooperating springs.

Fig. 18 is a fragmental axial sectional view on the line XVIII—XVIII of Fig. 17.

Fig. 19 is a sectional view taken on line XIX—XIX of Fig. 18.

Fig. 20 is a fragmental view substantially of a radial section of an embodiment belonging to the third group of the invented device in which wedge-like locking members are employed groupwise in the casings, attached to the driving or driven members, respectively.

Fig. 21 is a fragmental axial sectional view on the line XXI—XXI of Fig. 20.

Fig. 22 is a fragmental axial sectional view of another embodiment of the first group in which antifrictional pressure bearing locking members, such as balls, are arranged in bores of a hub of a gear, such balls cooperating, under pressure of springs with suitable seats provided in keylike inserts of the shaft upon which the gear is rotatably mounted.

Fig. 23 is a radial sectional view taken on the line XXIII—XXIII of Fig. 22.

Fig. 24 is a fragmental axial sectional view of an embodiment of the third group of the invented device in which two power transmitting, rotatably co-axially mounted bodies—one being the driving, the other the driven member each—have one ringlike body, securely attached to it, the inner ringlike body being the casing of the antifrictional pressure bearing locking elements and the outer ringlike body carrying the seats cooperating with said locking elements.

Fig. 25 is the partial radial sectional view on the line XXV—XXV of Fig. 24.

Fig. 26 shows substantially the same embodiment as shown in Figs. 24 and 25 with the difference that of the two rings interposed between the driving and driven rotatable members the inner one (keyed to the shaft) is provided with seats for the locking elements, and the outer ring with bores to accommodate the locking elements, the compressing springs and their tension regulating means.

Fig. 27 is a partial radial sectional view on the line XXVII—XXVII of Fig. 26.

Referring closer to the drawings by the characters of reference, Figs. 1 and 2 show an examplary embodiment of the first group within the scope of the invention, in which group the locking elements, having a body generated by revolution of a plan figure around an axis, specifically shown to be balls, cooperate with the driving and driven members of the power transmission so as to transmit torque from one part to the other. One part is shown to be the spur gear 1, the other part the shaft 2, the former mounted rotatably on the latter.

In the central portion of the spur gear 1 adjacent to the shaft 2 are apertures or recesses 3 with openings toward shaft 2, in which recesses the balls 4 are movably accommodated. The diameters of the balls 4 are somewhat smaller than the width of the apertures 3 to allow the movement of the balls within said apertures.

Cups 5—accommodating one end portion of helical spring 6—are mounted slideably in apertures 3. Each aperture 3 shelters a number of sets of balls 4, cups 5, and compressing-springs 6, this number of sets shown to be three as an example.

Spacers 7 serve to adjust the position of cups 5 in radial direction and with it the pressure of springs 6, with which these urge the balls 4 to occupy suitable seats 8 formed in the surface of shaft 2 at such locations that are corresponding to those of the balls 4. The shape of the seats 8 shown is a spherical cap corresponding to the diameter of balls 4.

Spacers 7 are provided preferably at one end with a wedge-like portion facilitating their insertion, and at their other end with a head 9 for convenient extraction. For the sake of simplicity only one such spacer 7 is shown in each aperture 3. The adjustment of the radial position of cups 5 and with it the pressure of the springs 6 is effected by inserting thicker or thinner spacers 7.

In the exemplary embodiment three apertures 3 are shown, spaced at 120 degrees from each other, each recess accommodating three balls 4. It will be understood, however, also in cases of any other embodiments shown or conceivable in the scope of the invention, that any number of apertures, locking members, seats and springs can be employed in equal angular spacing around the axis to cooperate between driving and driven members, depending upon their dimensions, the torque to be transmitted and on the material of the cooperating parts.

The recesses 3 in spur gear 1 and the seats 8 in the shaft 2 are arranged in equal angular spacing so that in the position in which one aperture faces one row of seats, every other aperture does this with respect to another row of seats.

Gear 1 is shown to be provided with a counterbore on each of its faces in which discs 10 and 11 are fitted and held firmly by the screws 12 to the gear 1, the latter having suitable bores 13, serving to admit the screws.

Discs 10 and 11 have the necessary central bores for sliding, together with gear 1, on the shaft 2.

Cooperating with the shaft 2, the discs 10 and 11 may have grooves 14 or other suitable means to retain lubricant in the apertures 3 that are dust-proofingly closed in axial direction by the discs 10 and 11.

Screws 12 are shown to have countersunk heads accommodated in disc 10 and screwed into the tapped holes of disc 11, which has suitable recesses for heads 9 of spacers 7. Screws 12 are provided with suitable locking means, such as a riveted-down tip, shown.

It is evident that any other type of screw, bolt, rivet or approved attachment and locking means can be used to hold the discs securely to the gear.

In Fig. 1 a fragment of the disc 11 is shown in elevational view, the rest being broken away. Gear 1 is rotatably mounted on a suitable seat of shaft 2 and is prevented to shift axially by suitable means, such as shoulder 15 of shaft 2 and washers 16 held against disc 11 by nut 17, which is mounted on the threaded portion of shaft 2 and locked by adequate means, such as set-screws 18, to said shaft 2.

Ducts 19 in shaft 2 branching out from a lubrication fitting (not shown) reach all recesses 3 and serve to convey to them the lubricating material.

The operation of the device is described as follows:

Balls 4, urged by springs 6 into seats 8, lock gear 1 to the shaft 2 so that gear 1 will turn together with shaft 2 as one unit when torque is transmitted from the shaft, or vice versa, until the magnitude of the torque does not exceed the limit at which the radial component of the torque, acting against the pressure of springs 6, equals that pressure in addition to the friction, counteracting the movement of the balls relative to their seats 8.

In the event that the transmitted torque for any reason whatsoever, rises to such a magnitude that its radial component overcomes the spring pressure and the friction, the balls 4 will be thrown out of seats 8 radially against the spring pressure, and the gear 1 will idle on shaft 2. During such idling the balls will oscillate radially within recesses 3, jumping into and out of seats 8 until the cause of the excessive torque is removed.

When the torque decreases to or below the permitted maximum—determined in a given device by the pressure of the springs and the friction—then the pressure of the springs 6 (properly adjusted) becomes greater than the radial component of the torque acting against them, and the pressure of springs 6 will cause the balls 4 to retain the seats 8 reestablishing fixed relative positions of gear 1 in respect to shaft 2.

The locking of the driving and the driven members to each other is entirely automatic and is caused by the variation of the value of the torque, thus eliminating the danger of a possible break or excessive wear due to sudden overloads and shocks, incident to almost every utilization of mechanical power.

By making the locking members and cooperating surfaces accurately machined, suitably hard and providing for adequate lubrication and sealing, the periodical disengagement of the locking members from the seats and their engagement with them, respectively, will not injure any of the parts and the device will outlive practically the rest of the machinery.

In dimensioning and adjusting, respectively, the springs 6 allowance has to be made for the centrifugal forces acting radially, which, however, will affect the dimensions only when comparatively high speeds and locking elements of substantial weight are employed.

Fig. 3 is a fragmental axial section of an embodiment which is substantially the same as shown in Figs. 1 and 2 with the exception that instead of three row of balls, three rollers 20 are used as locking elements between the gear 1 and shaft 2. A radial cross section of Fig. 3 would show the same picture as Fig. 1; hence it is omitted to avoid repetition. The like parts are identified by like characters, for the description of which reference is made to that of Figs. 1 and 2.

Differing parts are cups 21, each accommodating one roller and two springs in shaft 2 and the seats 22 which have a cylindrical portion to fit the rollers 20.

The operation of this embodiment is similar to that of the embodiment shown in Figs. 1 and 2 inasmuch as the radial components of the excessive torque will throw out the rollers 20 from seats 22 radially against the pressure of the springs 6.

Fig. 4 shows a third embodiment of the first group having as locking members bodies of a shape generated by revolution of a plane figure around an axis, shown to be balls. The driving and driven members are shown to be co-axial discs 23 and 24, for the sake of simplicity shown to be of one integral piece with their shafts, rotatably mounted in bearings 25 and 26.

The peripheral portion of disc 23 has apertures 27 in which balls 4 and springs 6 are accommodated. The springs 6 urge the balls 4 to occupy the seats 8 in disc 24, located correspondingly to apertures 27. Both are arranged in equal angular spacing in the discs 23 and 24 respectively.

The apertures 27 have a tapped hole to suit the adjusting screws 28 the end of which is serving as an abutment for the springs 6. By threading in or out the screws 28 the pressure of springs 6 upon balls 4 is increased or decreased, respectively, to obtain the desired magnitude of the spring pressure determining the maximum torque transmissible.

Suitable locking means such as lock-nuts 29 serve to make the adjustment permanent.

Lubrication can be provided by any known means, e. g., the whole device can be inclosed in a lubricant containing casing 30 (shown broken away).

Washers 31 between the discs 23, 24, and bearings 25, 26, respectively, serve to restrain axial movement of the discs, which purpose can be attained by other known means such as thrust bearings, collars, etc.

The operation of this embodiment is similar to that of the previous ones except that the radial component of the excessive torque will eject the balls 4 from their seats 8 in axial direction against the pressure of springs 6.

Figs. 5 and 6 illustrate an embodiment of the second group of the device within the scope of my invention, in which group the locking elements between the driving and driven members have a shape bounded by at least one plane surface, which, cooperating with a guide, prevent the turning of the locking element having one end portion wedge-shaped preferably with rounded edge. In the embodiments of the second group, shown herein, the locking elements are illustrated to be substantially cuboids topped by a wedge-shaped end portion the edge of which is being rounded.

For sake of simplicity the driving and driven members, respectively, are shown to be spur gear 32 and the shaft 33, the former being mounted rotatably on the latter.

In the central portion of the spur gear 32 are recesses or apertures 34 with openings toward the shaft 33, in which apertures the prismatic bodies 35 are reciprocably mounted, guided by the walls of the apertures 34.

One end portion of the locking elements 35 is wedge-shaped, the edge of the wedge being rounded. This end portion fits the seats or grooves 36 provided in shaft 33.

Springs 6 are seated in the counter-bores of the locking elements 35 and those of the nests 37 slidably accommodated in the apertures 34, the spring pressure being adjustable by the insertion of one or more spacers 7, provided with heads 9.

Seated fittingly in counterbores in both faces of gear 32, discs 38 and 39 cover the end portions of the seat-grooves 36, which may be longer in axial direction than is the width of the gear 32, and seal dustproofingly the apertures 34.

In their central bore the discs are provided with several lubricant retaining grooves 14 cooperating with shaft 33. Disc 39 is provided with suitable recesses to accommodate heads 9 of spacers 7.

The discs 38 and 39 are held to the gear 32 by suitable means such as screws 40 which traverse the gear 32 in suitable bores and are sufficiently riveted down or otherwise deformed at their ends after the assembly to prevent accidental loosening.

Gear 32 is restrained axially on shaft 33 by suitable means such as the shoulder 15 in one direction and in the other by washer 16, nut 17—mounted upon a threaded portion of shaft 33—the nut 17 being provided with locking means such as set-screws 18.

Ducts 19 serve to convey lubricating material from a known fitting (not shown) into the apertures 34, while grooves 41 in the surfaces of the locking members 35 admit the lubricant further into the apertures 34.

Fig. 6 shows three individual locking elements operating adjacently in an aperture 34. A suitable number of apertures can be arranged holding the described operating members, which apertures—similarly to as many seat-grooves in the shaft 33—are arranged in equal angular spacing.

The torque being transmitted between the gear 32 and shaft 33, by contacting sides of locking elements 35 and seat-grooves 36, and the reaction being perpendicular to the surfaces, it will have a radial component which tends to eject the locking bodies 35 from the grooves 36 against the pressure of the springs 6.

As long the pressure of the springs in addition to the friction between the locking elements, their seats and guiding parts is greater than the radial component of the transmitted torque, the locking elements retail their seats in the grooves 36 and the gear 32 turns as one body with shaft 33.

In the event that the transmitted torque, for any reason whatsoever, rises to such a magnitude that its radial component overcomes the spring pressure and the friction, the locking elements 35 will be ejected from the seats 36 radially against the spring pressure, and the gear 32 will idle on shaft 33 or the shaft 33 will idle in gear 32 according to which part is the driven one. During the idling the locking elements will oscillate radially within the apertures 34, jumping into and out from the seats 36 as long as the excessive torque is prevailing.

When the torque becomes equal to or less than the permitted maximum then the pressure of the springs, dimensioned or adjusted accordingly, will exceed the radial component of the torque and cause the locking members 35 to retain the seats 36 re-establishing fixed relative positions of the gear 32 with respect to the shaft 33.

Fig. 7 shows substantially the same embodiment of the second group except that instead of the several individual locking elements in each recess there is one locking bar 42 reciprocatingly mounted in each aperture 34 of the gear 32. Ducts 43 admit the lubricant through the locking bar 42 into the outer space of the recesses 34.

A radial section of this embodiment will give a picture similar to Fig. 5.

Fig. 8, 9 and 10 show a fourth embodiment of the first group. The torque transmitting member 44 is mounted rotatably on shaft 45, constituting the driving and driven members of a power transmission.

Member 44 has apertures 46 open toward the shaft 45, each aperture accommodating one or more reciprocably mounted guides 47 having suitably formed deepenings for balls 4. Springs 6 in nests 48 pressing upon guides 47 urge balls 4 to enter the seats 8 formed in the surface of keylike inserts 49 accommodated in suitable keyways in shaft 45.

Discs 50 and 51, seated in counter-bores on both faces of member 44 and having suitable bores to cooperate with the shaft 45, are attached by known means such as screws 12 to the member 44.

Discs 50 and 51 dust-proofingly seal the apertures 46 in axial direction. Discs 51 has suitable recesses to accommodate heads 9 of spacers 7 serving as adjustment means for regulating the pressure of the springs 6 upon balls 4 and with it the transmissible maximum torque.

Axial restraining of the member 44 with respect to shaft 45 is attained by suitable means such as shoulder 15 in one direction, and in the other by the washer 16, and nut 17 mounted on the threaded portion of shaft 45, said nut 17 being locked to the shaft 45 by suitable means such as set-screw 18.

The arrangement of the ball seats 8 in easily exchangeable inserts 49 has the purpose to make a renewal inexpensive.

Ducts 19 convey the lubricant from a fitting (not shown) to the balls 4. Guides 47 are provided with grooves 41 to admit the lubricant into the outer portion of apertures 46. One or more apertures may be arranged in member 44 in which latter case they are located preferably in equal angular spacing. The same holds true of the key-like inserts 49.

Aperture 46 is shown to accommodate two sets of balls, guides and springs but they may accommodate any suitable number of them.

Fig. 10 is the plan view of an insert 49 provided with two ball seats 8 and a lubricating duct. The operation of this embodiment is similar to that shown in Figs. 1 and 2 to the description of which I refer.

Figs. 11 and 12 show a fifth embodiment of the first group which differs from that illustrated in Figs. 8 and 9 only that between the driven and driving members 44 and 45, respectively, the rollers 52 are employed, instead of balls, as locking members.

Throughout the description the member designated as "driving" is that upon which the driving power acts, and the "driven" is that connected with the load or resistance.

The rollers 52 are mounted oscillatably in apertures 46 of member 44 and are urged by springs 6, positioned in nest 48, pressing upon guide 53 which is suitably recessed to accommodate partially the roller 52. The latter is urged by the pressure of the springs to occupy seat 54 in the key-like insert 55 accommodated in suitable keyways in the shaft 45.

Discs 50 and 51, spacers 7, attachment screws 12, lubricant retaining grooves 14, lubrication ducts 19, grooves 41, retaining washers 16, shoulder 15 serve in the same way as described in the previous figures.

Nut 56 on the threaded portion of shaft 45 prevents axial motion of the unit on the shaft 45.

Set-screw 57 is shown as locking means which is inserted in axial direction in nut 56 and shaft 45.

Fig. 11 is a fragmental axial sectional view; a radial sectional view of the same embodiment would look exactly like Fig. 8.

Fig. 12 is a plan view of a key-like insert 55 showing the seat 54 and a lubrication bore.

While in the embodiments shown in Figs. 1 to 12 each part is to be handled and inserted separately, Figs. 13 to 27 illustrate a third group of embodiments in which the locking elements and cooperating parts are accommodated in cages, carriers, or rings forming a unit which is easily insertable between the driving and the driven members. This facilitates the assembling and disassembling.

Fig. 13 is a fragmental radial sectional view and Fig. 14 a fragmental axial sectional view of the first embodiment of the third group.

This embodiment is created substantially by employing all the parts of the embodiment shown in Figs. 8 and 9 and placing the locking elements and cooperating parts in carriers 58 which are shaped as casings fitting the suitably dimensioned apertures 46 in the torque transmitting member 44.

Nut 56 and locking set screw 57 are similar to those of Fig. 11.

Fig. 15 is another embodiment of the third group developed by using the parts of Fig. 11, placing them in suitable casing 58 accommodated in the apertures 46 of the torque transmitting member 44.

A radial section of the embodiment shown in Fig. 15 would be like Fig. 13.

For description of the parts shown in Figs. 13, 14, 15, I refer to such given for those designated by identical characters in the Figs. 8 to 12.

Fig. 16 shows the detached, casing-shaped carrier 58 in axometric projection.

Figs. 17, 18, 19, show a third embodiment of the third group of the device. Fig. 17 is a fragmental radial sectional view of the device a portion of it being an elevational view. Fig. 18 is a fragmental axial section on line XVIII—XVIII of Fig. 17 and Fig. 19 is a sectional view on the line XIX—XIX of Fig. 18.

This embodiment is similar to that illustrated in Figs. 13 and 14, except, that the carrier of the locking elements is a solid block 59 in which bores 60 are arranged to receive cylindrical, plunger-like guides 61 holding the antifrictional locking elements, such as balls 4 that are urged by the springs 6 to occupy the suitable seats 8 in the key like inserts 62 seated in suitable key-ways in shaft 63.

This shaft 63 is one of the driven respectively driving members while the member 64, rotatably arranged upon it, is the other one which is provided with the apertures 46 accommodating the blocks 59.

Springs 6 are also seated in cups 65 which are reciprocably mounted in the bores 60; they are backed by spacers 7 the number and thickness of which are chosen to regulate the spring pressure upon guides 61 and balls 4.

Disc 66 seated in a counter-bore in one face of member 64 has a central bore cooperating slideably with shaft 63 and also with shoulder 67 of the shaft which limits the axial movement of the rotatable member 64 on the shaft 63 toward the right.

Disc 68 mounted adjacent the other face of the rototable body 64 is split into two halves which are provided with a tongue and groove connection with each other so that they are radially insertable into grooves 69 of shaft 63.

Discs 66 and 68 are fastened together and to the rotatably mounted body 64, the apertures of which they seal, by suitable means such as screws 12 shown that pass through adequate bores through the member 64.

Ducts 19 and grooves 41 serve to convey the lubricant into the recesses 46 and bores 60, respectively.

Split disc 68 has suitable recesses for heads 9 of spacers 7.

The operation of this embodiment is substantially the same as that of the embodiments shown in Figs. 1 and 2. When excessive torque acts upon the device its radial component ejects the balls 4 from the seats 8 against the pressure of springs 6, and the rotating body 64 will idle upon and relative to the shaft 63 taking along the discs 66 and 68 which are slidable on the shaft and in the groove 69, respectively, securing the rotating body 64 axially upon shaft 63.

Figs. 20 and 21 illustrate a fourth embodiment of the third group of the invented device. This embodiment was developed by placing the wedge-shaped locking elements 35, shown in the embodiment illustrated in Figs. 5 and 6, together with their springs 6 and nests 70 in the casing 58 occupying apertures 46 of the transmission member 71 mounted on shaft 72.

Spacers 7 serve to adjust the spring pressure with which the wedge-shaped locking elements 35 are urged against the suitably shaped seats 73 arranged in keylike inserts 74 in the key-ways cut in the shaft 72.

Lubricating ducts 19 starting from lubricating fitting 75 lead to suitably located holes of key-like inserts 74 and to grooves 41, in the locking elements 35.

Discs 76 and 77 are accommodated in suitable counter-bores on both faces of member 71 to which they are attached by suitable means such as screws 12.

Member 71 is secured in axial direction by discs 76 and 77 cooperating with shoulder 78 of shaft 723 toward the right, and collar 79 toward the left, which is secured to shaft 72 by suitable means such as set screws 80.

The ejection of locking elements 35 from their seats 73 in key-like inserts 74 will automatically follow the increase of the torque between the driven and driving members 71 and 72 similarly to operation described for the embodiment shown in Figs. 5 and 6.

Figs. 22 and 23 show in fragmental axial and radial sectional views, respectively, the sixth embodiment of the first group of the device.

The torque transmitting member 81 shown to be a gear with an axially protruding hub-portion is rotatably mounted upon shaft 82.

The protruding hub-portion 83 is provided with bores 84 in which balls 4, plunger-like guides 61 and springs 6 are reciprocably arranged, retained by suitable scews 85 adjustably mounted in the threaded portion of bores 84.

By turning screws 85 the pressure of springs 6 upon guides 61 and balls 4 can be adjusted. Springs 6 urge balls 4 to occupy seats 8 in the key-like inserts 62, seated at equal angular spacing in shaft 82 just as the bores 84 are located around in the protruding hub-portion 83 of gear 81. The latter is secured axially by shoulder part 87 of shaft 82 toward the right, and by collar 79 locked to the shaft 82 by the set screws 80 toward the left.

Ducts 19 and grooves 41 serve to convey lubricant to contact surfaces; the set-screws 86 (Fig. 23) serve to lock the spring adjusting screw 85.

The function of this embodiment of the invented device is the same as that described for the embodiment shown in Figs. 1 and 2.

Figs. 24 and 25 represent a fifth embodiment of the third group of the invented device in which the carrier of the locking elements and cooperative parts is a co-axial ring located between the driving and driven transmission members.

The driving and driven members of a torque transmitting system are represented by body 88 and shaft 89, respectively, between which coaxially arranged are rings 90 and 91.

Ring 90 fits upon a seat of shaft 89 to which it is attached rigidly by suitable means such as keys 92.

Ring 90 has radial bores 93 in which plungerlike guides 61—accommodating in suitable impressions toward the periphery the balls 4 and toward the center the springs 6—are mounted reciprocably.

Spacers 94 supporting springs 6 in extensions of a smaller diameter of bores 93 serve to regulate the spring pressure by the variation of their number and thickness.

The pressure of the springs 6 urges balls 4 to occupy the suitable seats 8 formed in the inner surface of ring 91 and arranged——just like the bores 93—in equal angular spacing around the common axis.

Ring 91 is rigidly attached to the torque transmitting member 88 by suitable means such as keys 95.

Shoulder 96 of shaft 89 cooperates with one face of ring 90 preventing its shifting toward the right.

The shoulder 97 of ring 90 prevents the axial movement of ring 91 toward the right. Shoulder 98 of ring 91 restrains the torque transmitting member 88 in the same direction.

Disc 99, fitted into a suitable counter-bore of the left face of the member 88, acts also as a seal sliding with its inner bore on shaft 89 and is secured against axial motion toward the left by adequate means such as washer 16 retained by nut 17 mounted upon the threaded portion of shaft 89 and locked to it by set-screw 18.

Disc 99 will permit the idling of ring 91 together with the member 88 upon ring 90, but will restrain it in axial direction toward the left. Idling of the member 88 and ring 91 with respect to shaft 89 and ring 90 will follow any shock increasing the torque above the permitted maximum determined by the pressure of the springs upon the balls 4.

The lubrication fitting 75, and lubrication ducts 19 and grooves 41 convey lubricant to the moving surfaces.

Figs. 26 and 27 show substantially the same embodiment as represented in Figs. 24 and 25 except that the ring-like carrier 103 of the locking elements and their cooperating parts is mounted rotatably upon the ring 105 the latter bearing the seats 8 for balls 4. The power transmitting member 102, shown broken away, is mounted upon ring 103 to which it is attached firmly by suitable means such as keys 104 (see Fig. 27). Ring 103 is arranged rotatably upon the concentric ring 105 which in turn is attached rigidly by suitable means, such as keys 106, to the shaft 107, so that the power transmitting member 102 together with ring 103 may idle upon ring 105 connected to shaft 107.

Ring 103 is provided with bores 108 in which plungerlike guides 61 holding antifriction pressure bearing locking elements, such as balls 4, springs 6 and cups 65 are accommodated in a manner that the balls 4 are urged to occupy suitable seats 8 in the ring 105 located suitably and spaced in equal angular spacing around, similarly to bores 108.

One or more spacers 7 cooperating with the cups 65 serve to regulate the tension of the springs 6 determining the maximum torque transmissible with a given device.

Discs 109 and 110, firmly attached to the power transmitting body 102 by suitable means, such as screws 12, restrain the body 102 in axial direction as they cooperate with the shoulder 111 of the ring 105 and the shoulder 112 of shaft 107 preventing the axial movement toward the right while the washer 16, nut 17, locked by suitable means such as set screws 18 to the threaded portion of the shaft 107, restrain the rest of the device from axial movement toward the left.

Ducts 19 and grooves 41 distribute the lubricant.

Disc 110, acting also as a seal to the lubricated parts, has adequate recesses to accommodate heads 9 of spacers 7.

The operation of the device is similar to that described for the previous embodiments. The power transmitting members 102 and 107 revolve as a unit as long as the torque, transmitted from one to the other, does not exceed an allowable maximum and they become automatically disengaged from each other when the torque becomes greater than the allowable maximum. In this, as well as in all previously shown embodiments of my invention the driving and the driven members between which torque is transmitted, are mounted rotatably around the same common axis in a manner which allows only angular motion relative to each other, any relative axial motion being prevented by thrust resisting means, so that the locking elements are not subject of thrust forces which are accidental and would make the maximum torque to be transmitted unpredeterminable and uncertain. Also lubrication is provided in each embodiment for the surfaces subject to friction and sealing means employed to retain the lubricant and to prevent the entering of dust from the outside into the device.

Having thus fully described my invention, it is clear that various changes and alterations may be made in the form and arrangement of the parts also by substitution, multiplication, etc., without departing from the spirit and scope of the invention, hence, I do not intend to be limited by the particular embodiments herein shown and described, but

What I claim is:

1. Torque limiting device comprising a driving and a driven member coaxially rotatably mounted, guide means in fixed angular relationship to one of said members, a number of locking elements cooperating therewith for radial movement between non-locking and proper locking positions, in fixed angular relationship to the other member the same number of seats located and shaped for simultaneous coaction with finite surface areas of all of said locking elements, resilient means urging the latter to occupy said seats, and thrust resisting means preventing relative axial displacement of said locking elements and seats.

2. Torque limiting device comprising a driving and a driven member coaxially rotatably mounted, guide means in fixed angular relationship to one of said members, a number of locking elements cooperating therewith for radial movement between non-locking and proper locking positions, in fixed angular relationship to the other member the same number of seats located and shaped for simultaneous coaction with finite surface areas of all of said locking elements, resilient means urging the latter to occupy said seats, adjustment means for said resilient means, means for conveying and retaining lubricant to, respectively between, sliding surfaces, and thrust resisting means preventing relative axial displacement of said locking elements and seats.

3. Torque limiting device comprising a driving and a driven member coaxially rotatably mounted, two annular bodies each of which is coaxially fixed to one of said members, one of said annular bodies being rotatably mounted upon the other, in one of said annular bodies guide-means, a number of locking elements cooperating therewith for radial movement between non-locking and proper locking positions, in the other annular body the same number of seats located and shaped for simultaneous coaction with finite surface areas of all of said locking elements, resilient means urging latter to occupy said seats, and thrust resisting means preventing relative axial displacement of said locking elements and seats.

4. Torque limiting device comprising a driving and a driven member coaxially rotatably mounted, two annular bodies each of which is coaxially fixed to one of said members, one of said annular bodies being rotatably mounted upon the other, in one of said annular bodies guide-means, a number of locking elements cooperating therewith for radial movement between non-locking and proper locking positions, in the other annular body the same number of seats located and shaped for simultaneous coaction with finite surface areas of all of said locking elements, resilient means urging latter to occupy said seats, adjustment means for said resilient means, means for conveying and retaining lubricant to, respectively between, sliding surfaces, and thrust resisting means preventing relative axial displacement of said locking elements and seats.

ALBERT BERNHARD DE SALARDI.